No. 769,673. PATENTED SEPT. 6, 1904.
T. A. WILLIAMS.
HAY STACKER AND LOADER.
APPLICATION FILED JAN. 16, 1904.
NO MODEL. 2 SHEETS—SHEET 1.
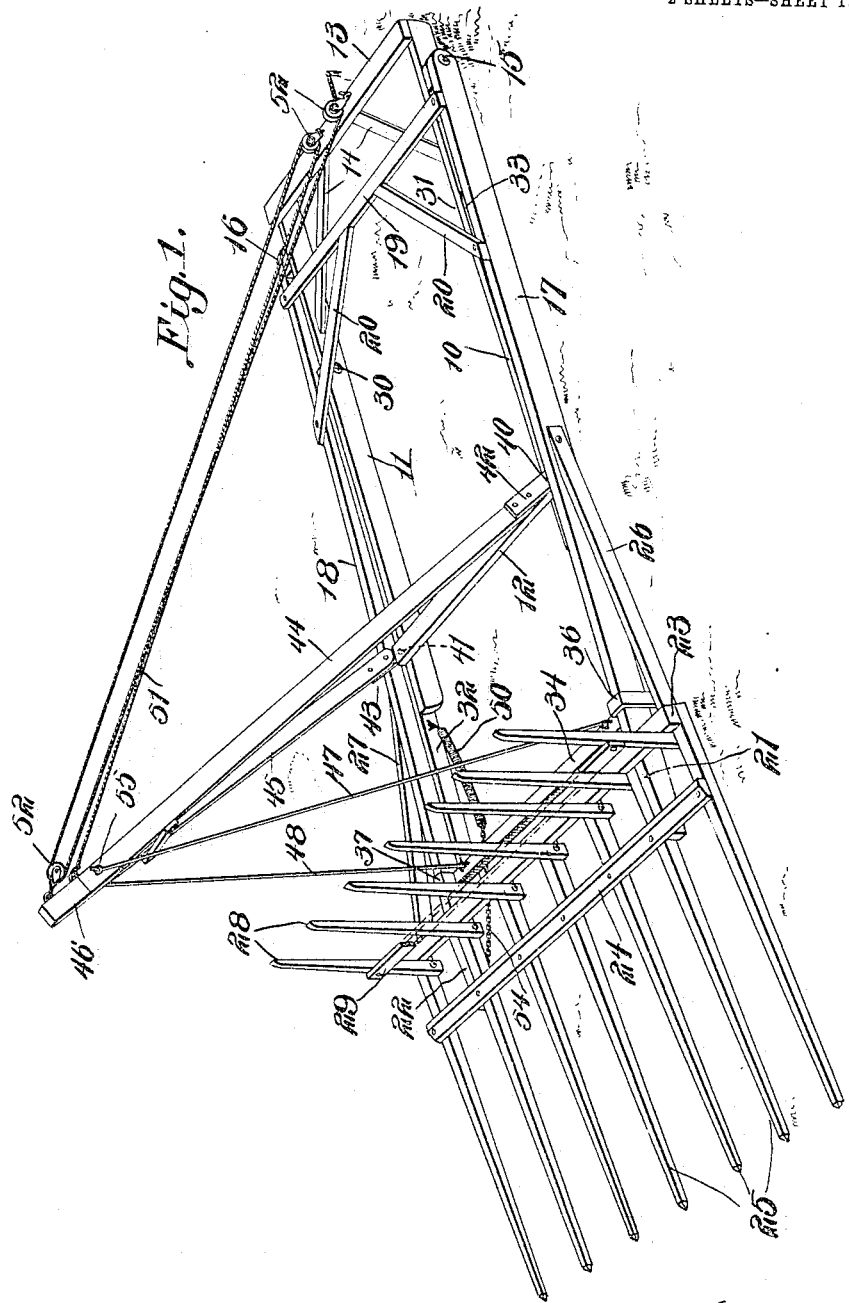

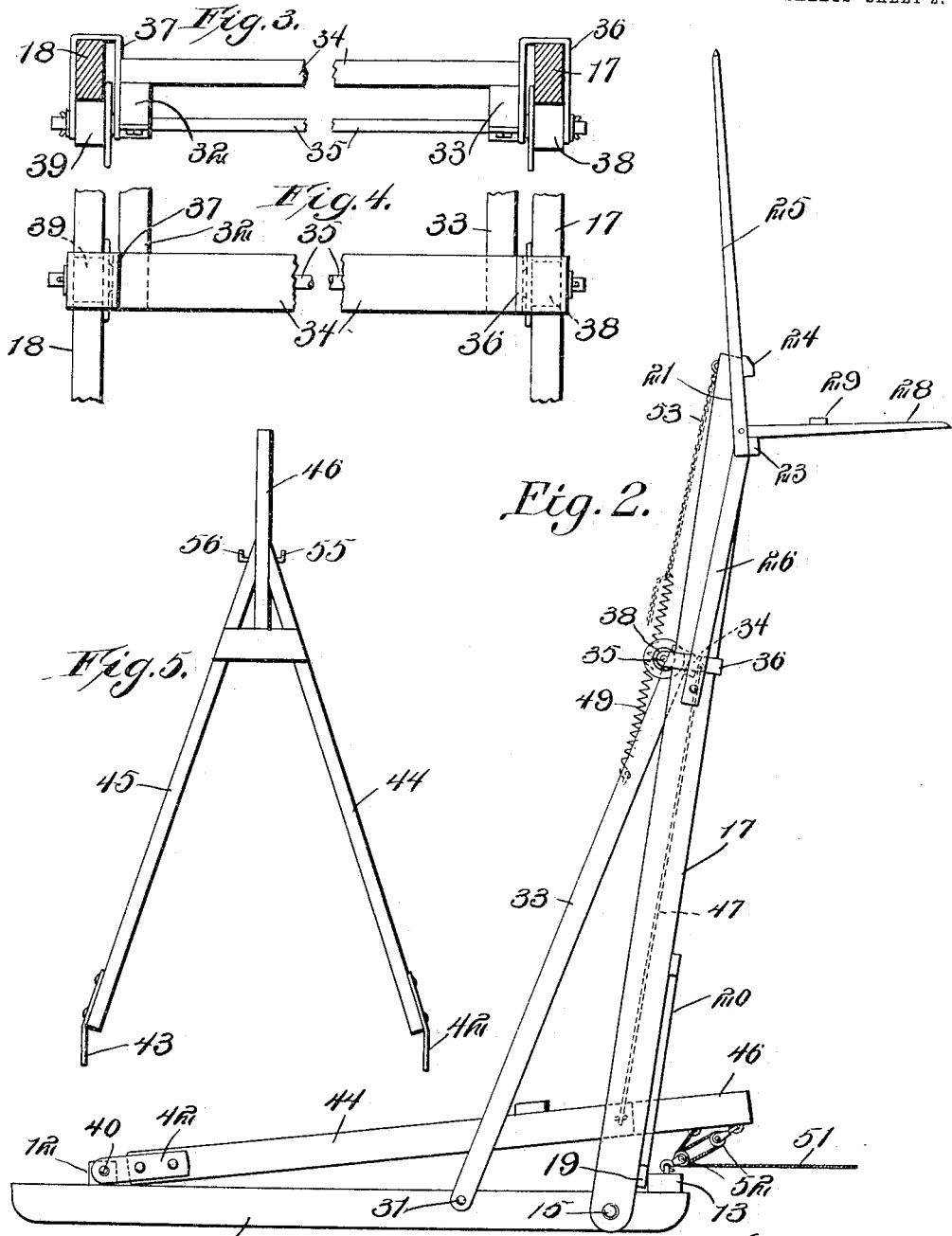

No. 769,673.

Patented September 6, 1904.

UNITED STATES PATENT OFFICE.

TIMOTHY A. WILLIAMS, OF WINIGAN, MISSOURI, ASSIGNOR TO AUGUSTUS G. SORGE AND JAMES H. SORGE, OF WINIGAN, MISSOURI.

HAY STACKER AND LOADER.

SPECIFICATION forming part of Letters Patent No. 769,673, dated September 6, 1904.

Application filed January 16, 1904. Serial No. 189,365. (No model.)

*To all whom it may concern:*

Be it known that I, TIMOTHY A. WILLIAMS, a citizen of the United States, residing at Winigan, in the county of Sullivan and State of Missouri, have invented a new and useful Hay Stacker and Loader, of which the following is a specification.

This invention relates to devices employed in stacking or "ricking" hay and similar products and materials, and has for its object to simplify and improve the construction of such devices and increase their power and capacity, without adding to the expense of their construction or causing a complication of parts.

The invention consists in certain novel features of construction, as hereinafter shown and described, and specified in the claims.

In the drawings illustrative of the invention, in which corresponding parts are denoted by like designating characters, Figure 1 is a perspective view of the device depressed, or in position to receive its load. Fig. 2 is a side elevation of the device elevated, or in position to discharge its load. Figs. 3 and 4 are enlarged detail views of the framework, illustrating more fully the construction of its parts. Fig. 5 is a view of the derrick member detached.

The improved device consists of a base member formed of spaced sides or runners 10 11, connected at their ends by transverse bars 12 13 and suitably strengthened by diagonal braces 14, as shown.

Pivoted at 15 16 to the runners 10 11 near their forward ends are the side arms 17 and 18 of the fork, which are connected near their rear ends by a cross-bar 19 and diagonal braces 20 and have their forward ends scarfed, as at 21 22, and connected by spaced cross-bars 23 and 24, the ends of the latter being extended beyond the side arms, as shown. The tines 25 of the fork are connected to cross-bars 23 24 and are supported at an angle to the longitudinal plane of the side arms by the scarfing of the arms, as will be obvious. By extending the bars 23 24 beyond the side arms 17 18 provision is made for correspondingly extending the width of the fork, and to support and strengthen these extended portions diagonal braces 26 27 are disposed at the sides, as shown. Guard-fingers 28 are pivoted to the tines 25 near their butt-ends and rest normally upon the cross-bar 23 and are supported thereby to limit their outward movement, to serve as rear supports to the load and prevent its falling from the fork when elevated. The guard-fingers are connected and supported by a transverse bar 29, as shown.

Pivoted at 30 31 to the runners 10 11 in the rear of the pivots 15 16 of the side arms 17 18 are radius-bars 32 33, connected at their upper ends by a cross-bar 34 and having a rod 35 extending transversely through their upper free ends, as shown.

Pivoted upon the rod 35 outside the bars 32 33 are yokes 36 37, embracing the side arms 17 18 and forming loose coupling means between radius-bars and side arms, as will be obvious. Rollers 38 39 are journaled upon the rod 35 within the yokes 36 37 and bear upon the lower surfaces of the side arms 17 18, and thus complete the couplings between radius-bars and the side arms of the fork.

Pivoted at 40 41 to the ends of the member 12 by straps 42 43 is a derrick formed of side bars 44 45, converging toward their free ends and connected to a central longitudinal member 46. The member 46 of the derrick is connected by rods 47 48 to the free ends of the radius-bars, as shown. Springs 49 50 are connected between the free ends of the side arms 17 18 and the radius-bars 32 33 at intermediate points thereon and are adapted to exert a force upon the side arms to cause them to start on their return to normal position, as will be hereinafter explained. An operating-cable 51 will be connected to the free end of the member 46 of the derrick and is carried over suitable pulleys 52 to secure the requisite power for operating the apparatus.

Any suitable motive power, such as animal or steam, may be employed for actuating the cable 51, and as the means for operating the device forms no part of the present invention it is not shown.

In operating the device the fork is depressed, as shown in Fig. 1, with the derrick inclining rearwardly or over the free or operating end of the fork and with the tines 25 flat upon the ground, ready to receive the load from the rakes or other gathering implements. When the load is in position, power is applied to the cable 51, with the result of tilting the derrick forwardly and causing the rods 47 48 to elevate the fork into a vertical position, as shown in Fig. 2, and to deliver the load to the rick or stack. The loose guard-fingers 28 serve an important function in this connection, as they hold the load while being elevated and effectually prevent it from falling backwardly from the fork. As the fork and its load is elevated into a vertical position or slightly beyond the vertical, it might not readily return by gravity to its normal position, and to obviate this the springs 49 50 are provided, to which a strain is imparted as the fork is elevated, and the reactionary of this force of the springs thus created draws the fork rearwardly until it has moved past the center or until the force of gravity can become active.

It will thus be obvious that a simply-constructed and efficient device is produced by which relatively heavy loads may be elevated and a stack or rick built up by the expenditure of the minimum of force and labor.

It will be noted that by the arrangement shown the pull of the derrick is almost directly vertical when first applied and when the load is heaviest and the force is gradually reduced as the load approaches its highest point, or where a comparatively small force is required to complete the throw of the fork. Consequently the force is automatically adapted to the load and the power is decreased relatively as the required force diminishes. Thus no waste of energy occurs in operating the device.

The springs 49 50 will preferably be adjustable to control the tension, as by sections of chains 53 54, interposed between one end and the arms 17 18 or the bars 32 33.

The rods 47 48 are preferably detachable from the derrick, as indicated at 55, so that the latter can be lowered flat upon the framework when the device is to be stored or shipped.

The members of the device may be constructed of any size or strength of material and will generally be of wood as light as consistent with the strains to which they will be subjected, and may be varied in proportions and modified in other minor particulars without departing from the principle of the invention or sacrificing any of its advantages.

Having thus described the invention, what I claim is—

1. In a stacker, the combination with a fork having pivoted side arms and adapted to swing into a vertical position when elevated, radius-bars pivoted at one end in the rear of the pivots of said side arms and slidably connected by their free ends therewith, a swinging derrick pivoted in the rear of the pivots of said radius-bars, connecting-rods between the free end of said derrick and the free ends of said radius-bars, and an operating-cable connected to the free end of said derrick, substantially as described.

2. In a stacker, the combination with a fork having pivoted side arms and adapted to swing into a vertical position when elevated, radius-bars pivoted at one end in the rear of the pivots of said side arms and carrying rollers at their free ends for engagement with said side arms, a swinging derrick pivoted in the rear of the pivots of said radius-bars, connecting-rods between the free end of said derrick and the free ends of said radius-bars, and an operating-cable connected to the free ends of said derrick, substantially as described.

3. In a stacker, the combination with a fork having pivoted side arms and adapted to swing into a vertical position when elevated, radius-bars pivoted at one end in the rear of the pivots of said side arms and carrying yokes at their free ends for slidably inclosing said side arms, rollers journaled in said yokes and bearing against said side arms, a swinging derrick pivoted in the rear of the pivots of said radius-bars, connecting-rods between the free end of said derrick and the free ends of said radius-bars, and an operating-cable connected to the free end of said derrick, substantially as described.

4. In a stacker, the combination with a fork having pivoted side arms and adapted to swing into a vertical position when elevated, radius-bars pivoted at one end in the rear of the pivots of said side arms and carrying yokes at their free ends for slidably inclosing said side arms, rollers journaled within the yokes, a tie-rod connecting said yokes and forming bearings for the said rollers, a swinging derrick pivoted in the rear of the pivots of said radius-bars, connecting-rods between the free end of said derrick and the free ends of said radius-bars, and an operating-cable connected to the free end of said derrick, substantially as described.

5. In a stacker, the combination with a fork having pivoted side arms and adapted to swing into a vertical position when elevated, radius-bars pivoted at one end in the rear of the pivots of said side arms and slidably connected by their free ends therewith, a swinging derrick pivoted in the rear of the pivots of said radius-bars, connecting-rods between the free end of said derrick and the free ends of said radius-bars, springs between the free ends of said side arms and intermediate points of said radius-bars, substantially as described.

6. In a stacker, the combination with a fork having pivoted side arms and adapted to swing into a vertical position when elevated, radius-bars pivoted at one end in the rear of the pivots of said side arms and slidably connected by their free ends therewith, a swinging derrick pivoted in the rear of the pivots of said radius-bars, connecting-rods between the free end of said derrick and the free ends of said radius-bars, springs between the free ends of said side arms and intermediate points on said radius-bars, means for controlling the tension of said springs, substantially as described.

7. In a stacker, the combination with a base-frame for movement over the ground, a fork member having side arms pivoted by one end to one end of said frame radius-bars pivoted by one end intermediately of said frame and slidably engaging said side arms by their other ends, a swinging derrick pivoted to the opposite end of said frame from said side-arm pivots, connecting-rods between the free end of said derrick and the free ends of said radius-bars, and an operating-cable connected to the free end of said derrick, substantially as described.

8. In a stacker, the combination with a fork having pivoted side arms and adapted to swing into a vertical position when elevated, radius-bars pivoted at one end in the rear of the pivots of said side arms and slidably connected by their free ends therewith, a derrick formed of converging side bars pivoted in the rear of the pivots of said radius-bars, and united at their free ends to a central member, rods connected at the united free ends of said derrick-bars and diverging therefrom and united to the free ends of said radius-bars, and an operating-cable connected to the free end of said derrick, substantially as described.

In testimony that I claim the foregoing as my own I have hereto affixed my signature in the presence of two witnesses.

TIMOTHY A. WILLIAMS.

Witnesses:
 FRANK CONNER,
 J. F. MOFFITT.